United States Patent Office

2,929,752
Patented Mar. 22, 1960

2,929,752

PREVENTION OF DISCOLORATION OF MAGNESIUM IN HIGH TEMPERATURE WROUGHT OPERATION

Lyle G. Treat, Ferguson, and Donald J. Levy, Olivette, Mo., assignors to The Dow Chemical Company, Midland, Mich., a corporation of Delaware No Drawing. Application August 16, 1957
Serial No. 678,515

7 Claims. (Cl. 148—4)

This invention relates to a process for preventing the discoloration of magnesium in high temperature wrought operation.

In high temperature wrought operation, such as extruding, rolling, forging and forming, newly generated magnesium surface is exposed to the air at high temperatures in the range of 700° to 1100° F. Upon exposure to the atmosphere the magnesium becomes discolored due to the oxidation. This discoloration decreases the saleability of the product. It is known that the oxidation or discoloration of the freshly formed magnesium surface may be prevented by maintaining an inert atmosphere surrounding the metal. Gases such as nitrogen, carbon dioxide, and sulfur dioxide, have been used for this purpose. In United States Letters Patent No. 1,972,317 a method is described for preventing the oxidation of magnesium and other metals in the molten state by maintaining a fluorine-containing atmosphere above the molten metal. In United States Letters Patent No. 2,380,202 a process is described for preventing the deterioration of magnesium during heat treatment operations. This is accomplished by maintaining a fluorine-containing atomsphere in the furnace to prevent deterioration. In both of the above cited patents and in other methods that are used for the prevention of oxidation of magnesium and other metals at high temperature, such as using an atmosphere of carbon dioxide, sulfur dioxide, or nitrogen, the controlled atmosphere must be maintained continuously in contact with the metal. In heat treatment and melting operations, a relatively confined area as within the furnace is generally used. Thus, it is not difficult to control the atmosphere. In wrought operations, such as rolling or extruding, the formation of the metal is rapid and a very large area would have to be subjected to this controlled atmosphere making it expensive and impractical.

It has been discovered that the discoloration of magnesium in high temperature wrought operations may be prevented by subjecting the processed magnesium after the wrought operation to a fluorine-containing atmosphere having from 0.1 to 10,000 parts per million by volume of a fluorine compound in vapor form for a length of time in the range of 0.1 to 60 seconds.

It is unusual and unexpected that discoloration of the surface of magnesium may be prevented by momentarily exposing the surface to a fluorine-containing gas. In the prior art for heat treatment and for the molten metal, a continuous inert or fluorine-containing atmosphere had to be maintained. With the other atmospheres that have been used to prevent oxidation of magnesium, such as nitrogen, sulfur dioxide, carbon monoxide, and carbon dioxide, a momentary contact is ineffective. It is only the fluorine-containing atmosphere which will prevent discoloration of the magnesium by a momentary contact.

The term "magnesium," as used herein, means not only elemental magnesium but also alloys thereof which contain about 70 percent by weight or more of magnesium.

The term "high temperature wrought operation," as used herein, means a metal-working operation, such as rolling, forging, extruding, and forming, which is effected upon the solid metal at a temperature of at least 700° F.

The fluorine-containing atmosphere or gas stream may contain fluorine either in elemental form or combined form. Fluorine compounds which are normally gases at room temperature and atmospheric pressure, such as boron fluoride, hydrogen fluoride, silicon tetrafluoride, and dichlorodifluoromethane, may be used. Liquids and solids which sublime or vaporize at a temperature below 700° F. may also be employed. Illustrative examples of these fluorine compounds which may be converted to vapor phase by heating are ammonium silicofluoride, ammonium fluophosphate, and ammonium borofluoride. Of these fluorine compounds, the compounds which are normally gases are preferred, especially boron fluoride. Thus, the term "fluorine-containing," as used herein, includes fluorine compounds which are normally gases at room temperature and atmospheric pressure and fluorine compounds which sublime or vaporize at temperatures below 700° F. as well as elemental fluorine.

Numerous methods may be used for momentarily exposing the surface of the processed magnesium metal to a fluorine-containing atmosphere. The processed magnesium may be subjected to a fluorine-containing atmosphere within a confined area for a short period of time. The amount of fluorine compounds in the atmosphere may be very low. Concentrations from 0.10 part per million by volume of the fluorine compound in the atmosphere to as high as 10,000 parts per million are generally used, preferably from 5 to 500 parts per million. Besides this small amount of the fluorine-containing compound the remainder of the atmosphere is generally air. Inert gases, such as carbon monoxide, carbon dioxide, and nitrogen, may be employed instead of air, but very little advantage is realized by the substitution. The time that the metal is exposed to this atmosphere may be varied from 0.1 to 60 seconds. With the preferred concentration, a contact time of from 0.3 to 10 seconds is generally employed. As the concentration is decreased, a contact time up to 60 seconds may be desirable. Although a contact time greater than those set forth above and a cencentration of the fluorine compound higher than 10,000 parts per million may be used, a slight bluish color may develop upon the surface of the magnesium.

In addition to using a controlled atmosphere in a confined area, a convenient method is to pass the metal through a fluorine-containing gas stream flowing at a cross angle to the movement of the metal. For the gaseous fluorine compounds, an arrangement is used where jets of the fluorine-containing compound discharge toward the surface of the magnesium metal enveloping the metal as it leaves the die, the rolls, or other wrought operation. These jets can be placed about 2 to 7 inches above and below the metal surface for wide areas or just above or below for narrow pieces. In a like manner, the processed magnesium may be contacted with the vapors of the solid or liquid fluorine compounds by vaporizing or subliming the compounds and directing the vapors to envelop the processed metal. The fluorine-containing compound will intermix with the air prior to contacting the surface and thus in effect the processed magnesium will be exposed to a fluorine-containing atmosphere. The amount of the fluorine-containing gas or vapor required is so small that the operation can be carried out in a well-ventilated processing room. In extrusion operation, a flow rate in the range of 0.0005 to 0.5 liter per minute, preferably 0.05 liter per minute, of the fluorine-containing gas or vapor will adequately prevent discoloration at all normal extrusion speeds. In a rolling mill, a jet placed above and below the rolled sheet at the exit of the rolls will protect the surfaces of a sheet up to 3 feet wide. The rate of flow of the fluorine-containing gas or vapor through each of the jets is the same as that used for extrusion. For wider sheets more jets may be required to more evenly distribute the fluorine-containing stream.

The flow rate, as expressed herein, as "liters per minute" is based upon 25° C. and atmospheric pressure.

The following example further illustrates the invention but is not to be construed as limiting it thereto.

*Example I*

A steel delivery tube, ¼" I.D., was placed at the exit face of an extrusion die backer about 3 inches below the extruding metal. Boron fluoride was fed to this tube at a flow rate of 0.04 liter per minute (760 millimeters of pressure and 25° C.). Magnesium extrusions having a nominal composition of 6 weight percent zinc, 0.45 weight percent zirconium, and the remainder magnesium were up to 8 inches wide and ⅛ to ⅝ inch thick. Extrusion speeds of from 8 to 80 feet per minute caused the magnesium exit temperature to range from 880° to 1000° F. There was no discoloration on the metal emerging from the die when the gas was passed beneath the metal. The calculated concentration of boron fluoride in the atmosphere enveloping the extrude was about 5 parts per million by volume and the contacted time, as result of the different extrusion speeds, was from 6 seconds to 60 seconds.

When boron fluoride was not used, the extruded magnesium became heavily covered with a black film as it left the die. Sulfur dioxide was also tried. A non-uniform colored film was formed with the sulfur dioxide, even though the rate of flow of $SO_2$ was increased to the extent that the atmosphere within the extrusion building became irritating and the concentration within the building increased to concentrations presenting a toxicity problem.

The same discoloration-free surface was obtained by the method described above when magnesium alloys containing at least 70 percent magnesium and the remainder being either aluminum, zinc, zirconium, thorium, manganese or mixtures thereof, were extruded in a boron fluoride gas stream.

In a manner similar to that described above for boron fluoride, fluorine-containing gases, such as silicon tetrafluoride, dichlorodifluoromethane, hydrogen fluoride, or fluorine may be used. Also, fluorine compounds, such as ammonium silicofluoride, ammonium fluophosphate, and ammonium borofluoride, may be used to replace the boron fluoride by heating these compounds near the face of the die to convert them to a vapor at a controlled rate.

It will be apparent that by contacting the processed magnesium immediately after the wrought operation with a gas containing a fluorine compound the discoloration of magnesium surface is prevented. Only a momentary contact of the metal with this atmosphere is necessary. Thus, it is not necessary to control continuously the atmosphere to which the newly processed metal is exposed. By using boron fluoride and other fluorine-containing gases, it is possible to discharge small quantities of these fluorine-containing gases immediately at the face of the die or at the exit of the rolls and thus prevent the discoloration of the metal as it leaves the equipment. The amount of the fluorine-containing gas used is so small that ordinary ventilation systems are adequate in removing the fluorine-containing gas from within the building.

What is claimed is:

1. A process for preventing the discoloration of magnesium in high temperature wrought operation, which comprises contacting the processed undiscolored magnesium after the wrought operation with a fluorine-containing atmosphere having from 0.1 to 10,000 parts per million by volume of a fluorine-containing compound for a length of time in the range of 0.1 to 60 seconds.

2. A process for preventing the discoloration of magnesium in high temperature wrought operation, which comprises contacting the processed undiscolored magnesium after the wrought operation with a fluorine-containing atmosphere having from 5 to 500 parts per million by volume of a fluorine-containing compound for a length of time in the range of 0.3 to 10 seconds.

3. A process according to claim 2 wherein the fluorine-containing compound is boron fluoride.

4. A process according to claim 3 wherein the high temperature wrought operation is extruding.

5. A process according to claim 3 wherein the high temperature wrought operation is rolling.

6. In an extrusion operation of magnesium wherein the magnesium is forced through an extrusion die at a metal temperature in the range of 700° to 1100° F., the step to prevent the discoloration of the surface of the extruded magnesium which comprises discharging at a rate in the range of 0.0005 to 0.5 liter per minute a gaseous stream of a fluorine-containing compound to envelop the extruded metal at the exit of the extrusion die.

7. A process according to claim 6 wherein the fluorine-containing compound is boron fluoride and the discharge rate is 0.05 liter per minute.

References Cited in the file of this patent

UNITED STATES PATENTS

| | | |
|---|---|---|
| 1,972,317 | Reimers | Sept. 4, 1934 |
| 2,023,366 | Hoy | Dec. 3, 1935 |
| 2,023,498 | Winston | Dec. 10, 1935 |
| 2,187,594 | Wean | Jan. 16, 1940 |
| 2,380,202 | Stroup | July 10, 1945 |
| 2,659,252 | Kipp | Nov. 17, 1953 |

FOREIGN PATENTS

| | | |
|---|---|---|
| 655,072 | Great Britain | July 11, 1951 |

OTHER REFERENCES

The Technology of Mg and Its Alloys, F. A. Hughes & Co., pages 297, 398, 1940.